United States Patent
Kishore

(10) Patent No.: US 8,307,153 B2
(45) Date of Patent: Nov. 6, 2012

(54) POWER EFFICIENT AND RULE MOVEMENT OPTIMIZED TCAM MANAGEMENT

(75) Inventor: Salem Nanda Kishore, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 262 days.

(21) Appl. No.: 12/774,032

(22) Filed: May 5, 2010

(65) Prior Publication Data

US 2011/0276752 A1 Nov. 10, 2011

(51) Int. Cl.
- G06F 12/00 (2006.01)
- G06F 13/00 (2006.01)
- G06F 3/00 (2006.01)
- G06F 5/00 (2006.01)

(52) U.S. Cl. .............. 711/108; 711/159; 711/E12.002; 710/56

(58) Field of Classification Search ............ 711/108, 711/159, E12.002; 710/56
See application file for complete search history.

(56) References Cited

U.S. PATENT DOCUMENTS

| 2010/0100673 A1* | 4/2010 | Cheriton ............ 711/108 |
| 2011/0161580 A1* | 6/2011 | Shah et al. ......... 711/108 |

* cited by examiner

*Primary Examiner* — Edward Dudek, Jr.
(74) *Attorney, Agent, or Firm* — Harrity & Harrity, LLP

(57) ABSTRACT

A network device allocates a number of blocks of memory in a ternary content-addressable memory (TCAM) of the network device to each database of multiple databases, and assigns unused blocks of memory of the TCAM to a free pool. The network device also detects execution of a run mechanism by the TCAM, and allocates, based on the execution of the run mechanism, one of the unused blocks of memory to a filter or rule of one of the multiple databases.

18 Claims, 11 Drawing Sheets

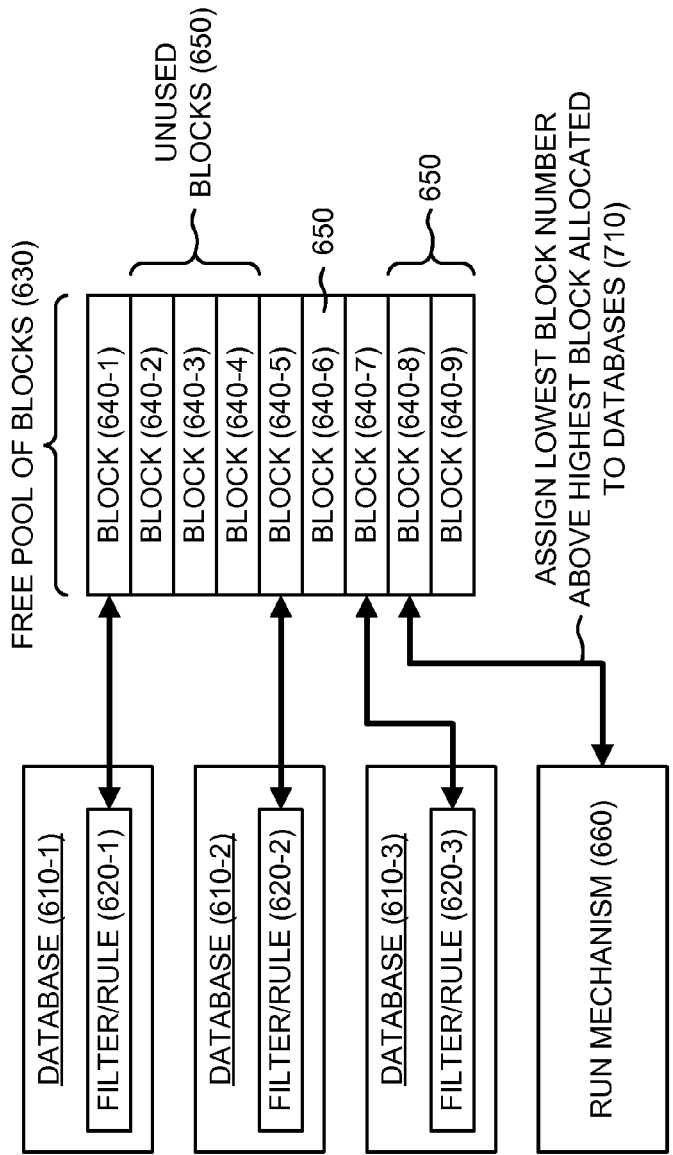

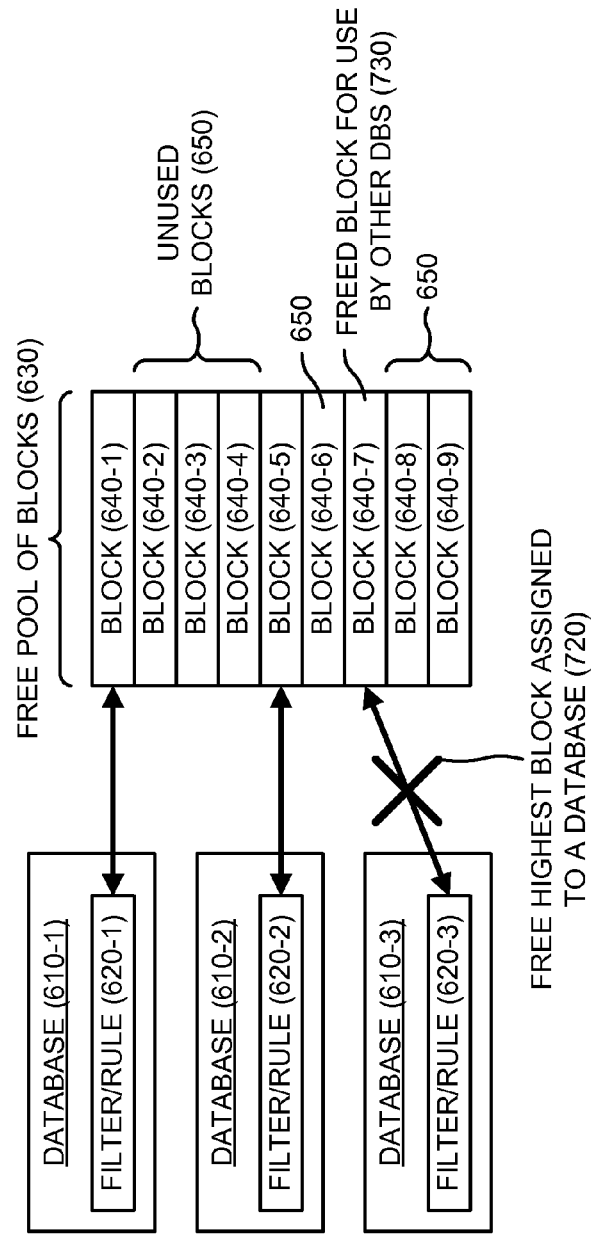

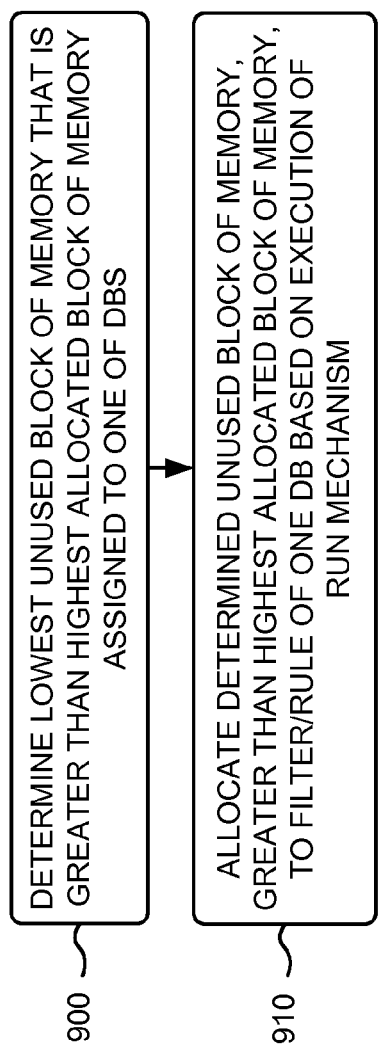

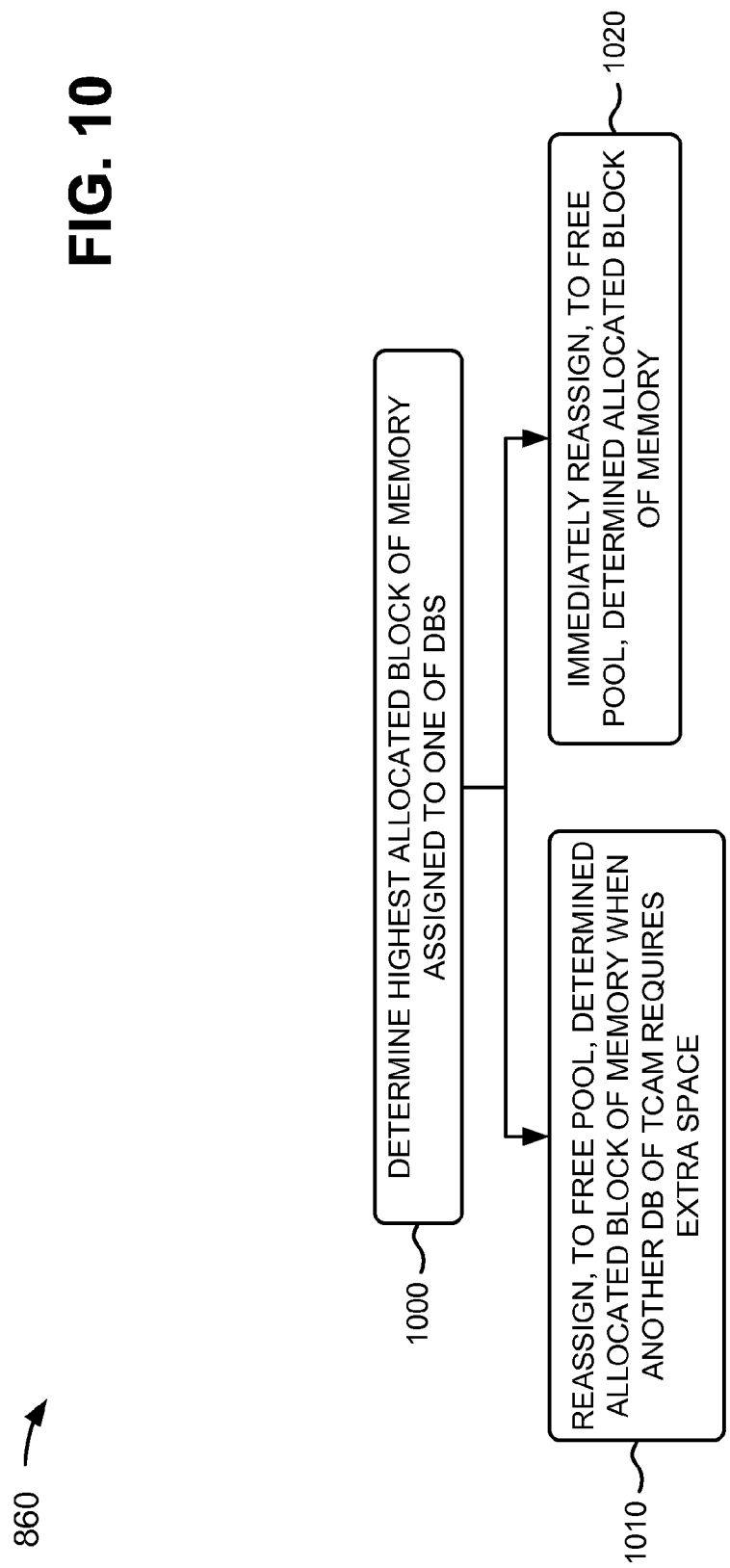

POWER EFFICIENT AND RULE MOVEMENT OPTIMIZED TCAM MANAGEMENT

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic.

A ternary content-addressable memory (TCAM) is commonly used in network devices and other communication devices for quickly identifying content within a packet. A network device may support a number of different features, such as a network device that functions as both a router and a firewall or a router capable of routing both Internet protocol, version 4 (IPv4) and IPv6 routing prefixes. A single TCAM device may be used to support multiple features. With the increasing number of features requiring TCAM support, such as various security and firewall features, deep packet inspection, routing, and tunnel termination features, sharing of a TCAM space can be a cost effective solution for many designs.

A TCAM may be programmed for various types of access control lists (ACLs) (e.g., port ACLs, virtual local area network (VLAN) ACLs, route ACLs, etc.) for both ingress and egress. An ACL may include a set of rules that are explicitly programmed by a network administrator or implicitly programmed by protocols. Each type of ACL is associated with a lookup which corresponds to a database stored in the TCAM. Each database logically belongs to one or more blocks of memory space in the TCAM. With static allocation of the size of each database in the TCAM (e.g., during initialization), a network device or components of a network device are limited by the database size. For example, some databases may overflow with information while other databases may be empty.

Updating an ACL (e.g., adding or deleting a single rule) leads to a large number of rule movements in the TCAM because of the order dependency of the rules. A run mechanism may be used to minimize movement of TCAM rules while updating an ACL. The run mechanism achieves this by maintaining details associated with the run mechanism and by sprinkling (e.g., putting spaces between) rules among available TCAM space (e.g., for a database or for the entire TCAM). The run mechanism can prevent rule movements, but the inherent behavior of sprinkling rules (e.g., throughout an entire TCAM memory space) is very inefficient in terms of power consumption. Power consumed by the TCAM forms a significant part of the power consumed by many network devices. The power consumed by a TCAM depends on how many blocks of memory (e.g., individual units of memory that need to be part of a TCAM lookup cycle) are enabled for lookup.

SUMMARY

According to one aspect, a method, implemented by a network device, may include allocating, by the network device, a number of blocks of memory in a ternary content-addressable memory (TCAM) of the network device to each database of a plurality of databases; assigning, by the network device, unused blocks of memory of the TCAM to a free pool; detecting, by the network device, execution of a run mechanism by the TCAM; and allocating, by the network device and based on the execution of the run mechanism, one of the unused blocks of memory to a filter or rule of one of the plurality of databases.

According to another aspect, a network device may include a memory to store a plurality of instructions, and store a TCAM. The network device may also include a processor to execute instructions in the memory to allocate a number of blocks of memory in the TCAM to each database of a plurality of databases, and assign unused blocks of memory of the TCAM to a free pool. The processor may also execute instructions in the memory to detect execution of a run mechanism by the TCAM, where the run mechanism is configured to add one or more filters or rules to the plurality of databases, and allocate, based on the execution of the run mechanism, one of the unused blocks of memory to a filter or rule of one of the plurality of databases.

According to still another aspect, a device may include a TCAM, and a processor to allocate a number of blocks of memory in the TCAM to each database of a plurality of databases, assign unused blocks of memory of the TCAM to a free pool, and detect execution of a run mechanism by the TCAM. The processor may also determine a lowest, based on location, unused block of memory of the TCAM that is greater than a highest, based on location, allocated block of memory of the TCAM assigned to one of the plurality of databases, and allocate, based on execution of the run mechanism, the determined unused block of memory to a filter or a rule of a particular database of the plurality of databases. The processor may further detect underutilization of the TCAM, and reassign, to the free pool, one of the allocated blocks of memory of the TCAM when the TCAM underutilization is detected.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 7A and 7B are diagrams of further example operations capable of being performed by a portion of the TCAM depicted in FIG. 3; and FIGS. 8-10 are flow charts of a process for providing power efficient and rule movement optimized TCAM management according to implementations described herein.

DETAILED DESCRIPTION

The following detailed description refers to the accompanying drawings. The same reference numbers in different drawings may identify the same or similar elements. Also, the following detailed description does not limit the invention.

Implementations described herein may include systems and/or methods that provide power efficient and rule movement optimized TCAM management for network devices. The systems and/or methods may modify a run mechanism so that rule movements in a TCAM are optimized and so that the TCAM is power efficient (e.g., for a network device containing the TCAM). The run mechanism may be modified since it may be allocated only a portion of the TCAM space, rather than the entire TCAM space (e.g., as is typically done for the run mechanism). The systems and/or methods may also select blocks of memory in the TCAM in such a way that the modified run mechanism is more efficient in rule movement.

The terms "component" and "device," as used herein, are intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

NETWORK CONFIGURATION

Figure 1:
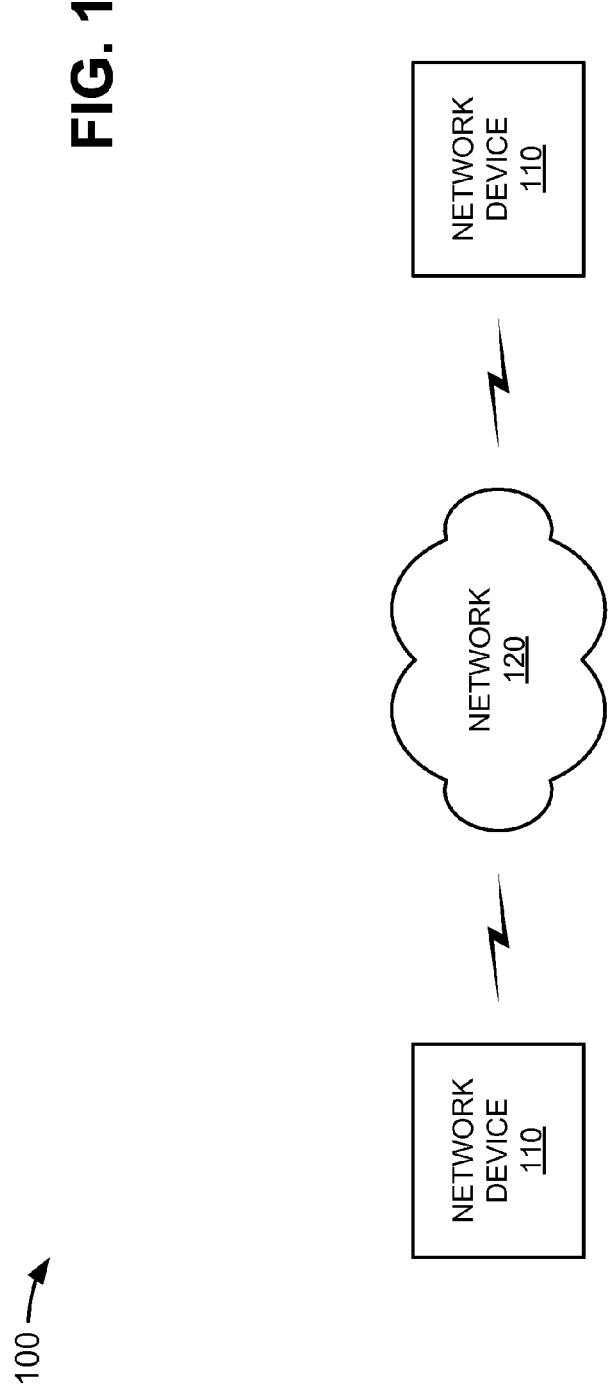
FIG. 1 is a diagram of an example of a network in which systems and/or methods described herein may be implemented.

FIG. 1 is a diagram of an example network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In one implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows example components of network 100, in other implementations, network 100 may contain fewer components, different components, differently arranged components, or additional components than depicted in FIG. 1.

NETWORK DEVICE CONFIGURATION

Figure 2:
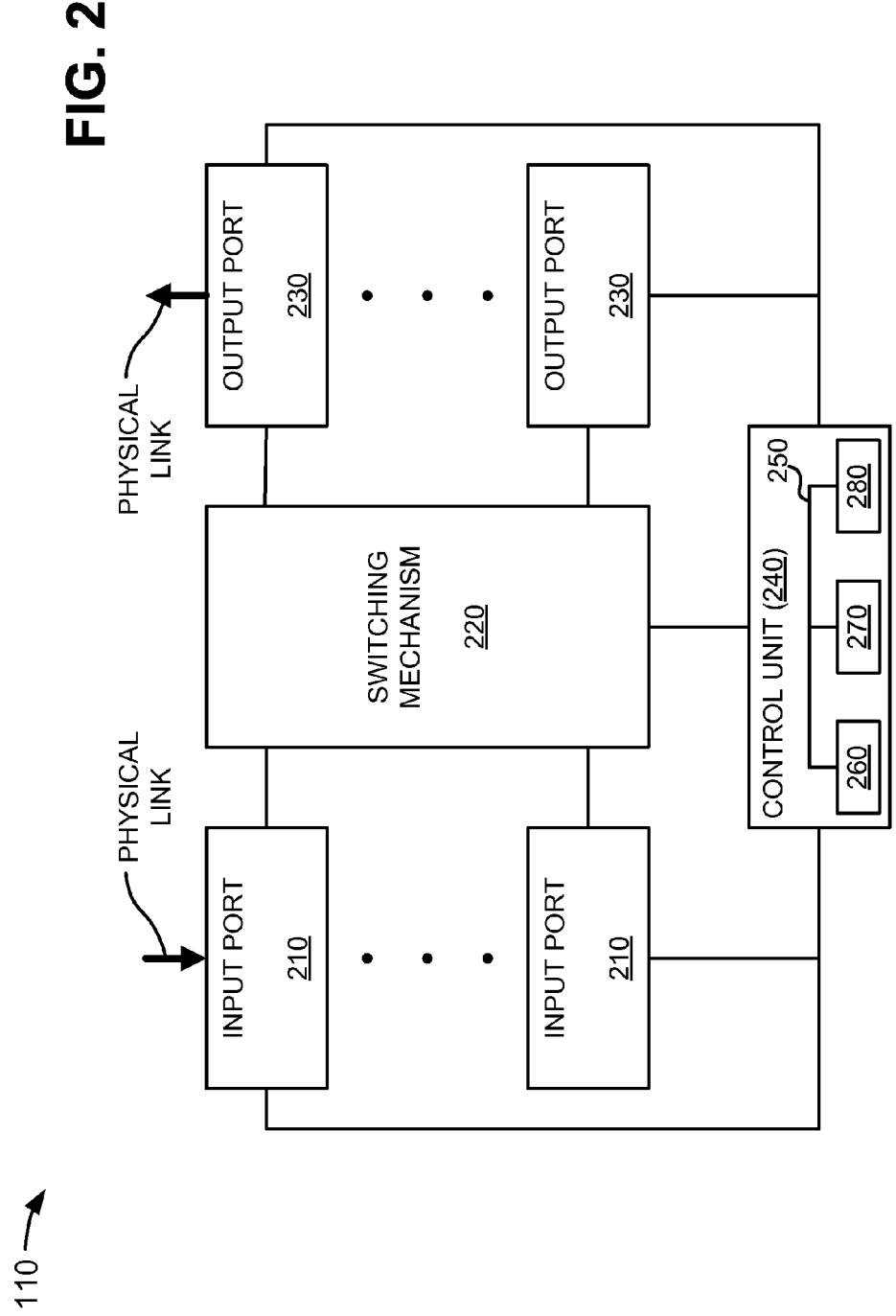
FIG. 2 is a diagram of example components of a network device depicted in FIG. 1.

FIG. 2 illustrates a diagram of example components of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In some implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link) Output ports 230 may include scheduling algorithms that support priorities and guarantees. Output ports 230 may support data link layer encapsulation and decapsulation, and/or a variety of higher-level protocols. In some implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In one implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of network device 110, in other implementations, network device 110 may contain fewer components, different components, differently arranged components, or additional components than depicted in FIG. 2. Alternatively, or additionally, one or more components of network device 110 may perform one or more other tasks described as being performed by one or more other components of network device 110.

Figure 3:
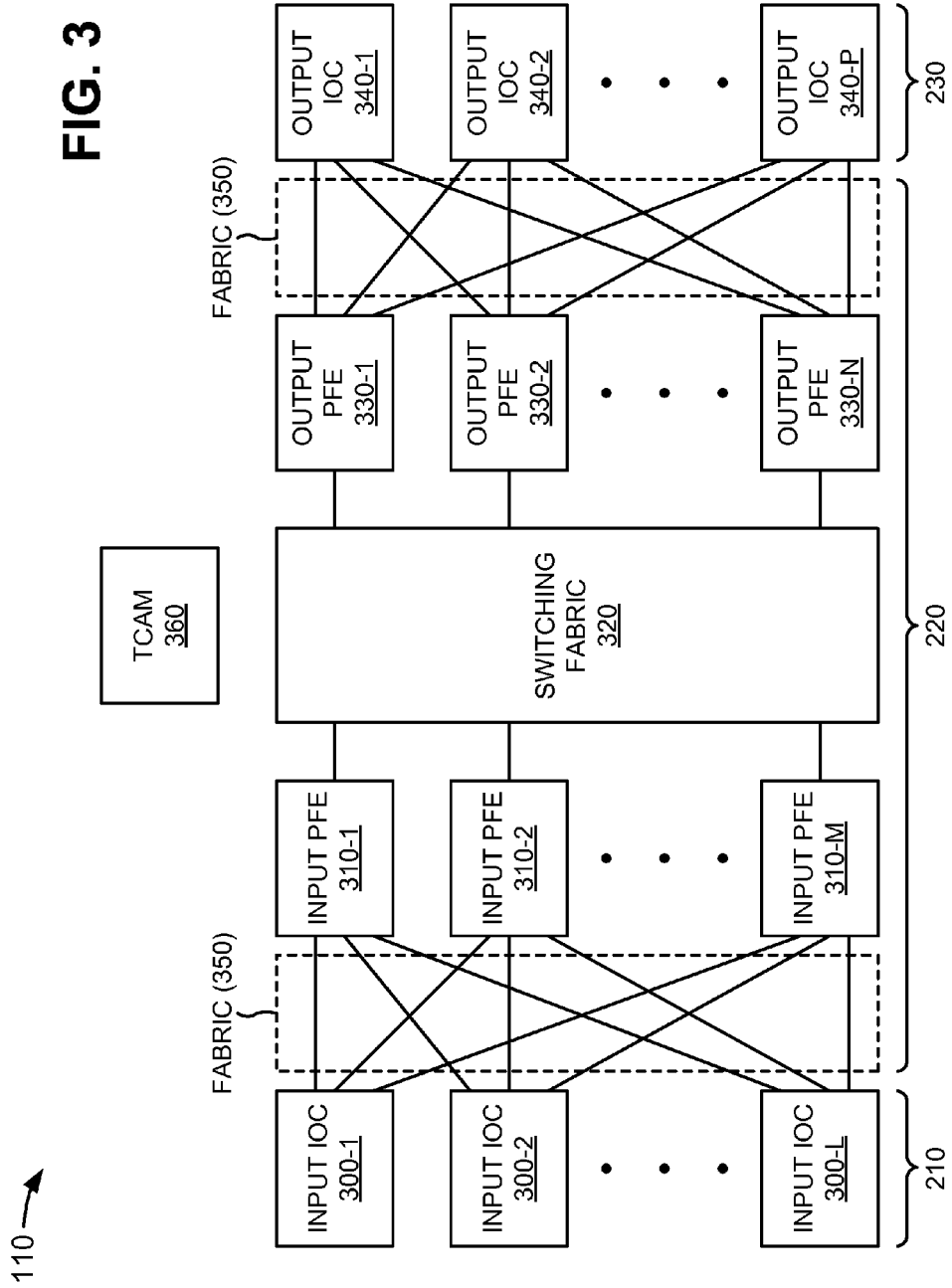
FIG. 3 is a diagram of further example components of the network device.
Figure 4:
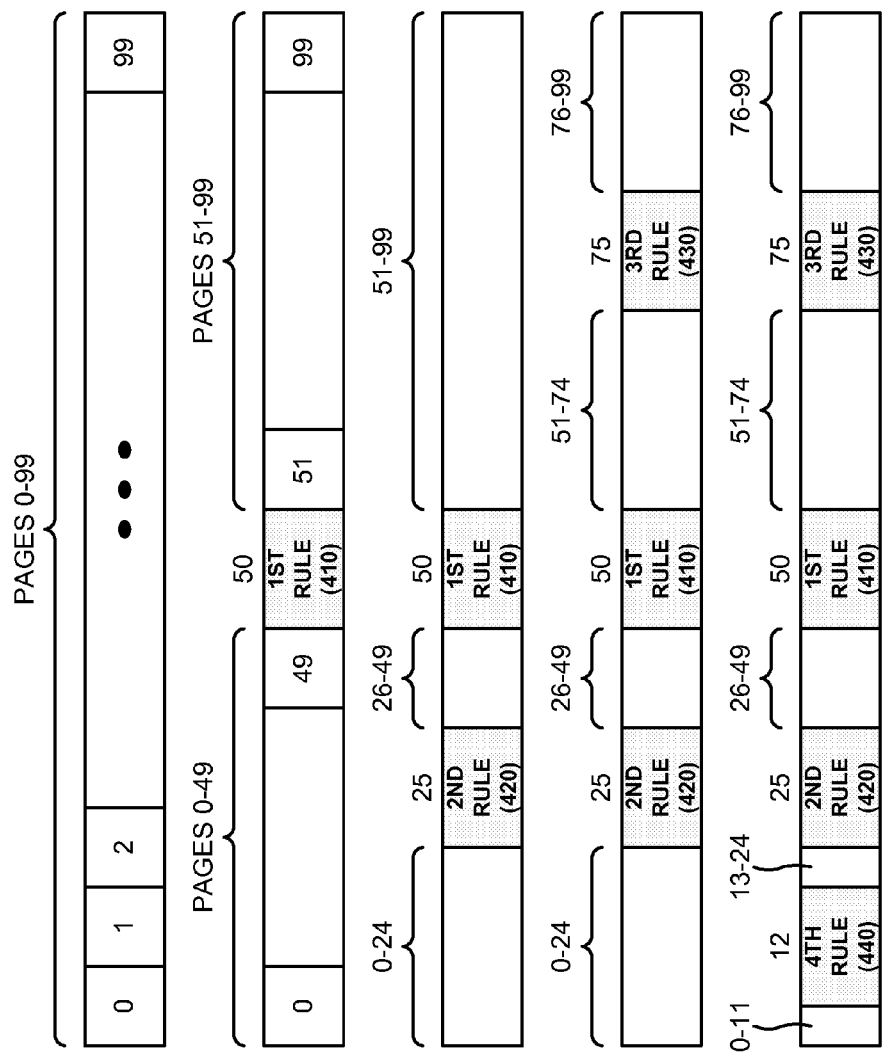
FIGS. 4A-4E are diagrams illustrating example operations capable of being performed by a run mechanism on a ternary content addressable memory (TCAM) depicted in FIG. 3.

FIG. 3 is a diagram of further example components of network device 110. As illustrated, network device 110 may include a group of input IOCs 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a switching fabric 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); fabrics 350; and a TCAM 360. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

Switching fabric 320 may include a switching component that may allow efficient communication between input PFEs 310 and output PFEs 330. For example, switching fabric 320 may include a hardwired non-blocking minimal spanning switch capable of connecting T inputs to T outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting S inputs to S outputs in any combination.

TCAM 360 may include a CAM, a TCAM, or some other type of content-addressable memory device. A CAM may include a type of associative computer memory that is designed for high-speed searching applications. Unlike standard random access computer memory in which the memory returns a data word based on a supplied address, a CAM may be designed such that, in response to a data word, the CAM may perform a parallel search of its entire memory to determine if that data word is stored. If the data word is found, the CAM may return a list of the storage addresses where the data word was found.

In an implementation, the CAM may particularly be a TCAM. A TCAM may include a CAM that allows states in the CAM to be specified as "don't care" states. For example, a TCAM might have an entry such as "10XX0," where "X" may indicate the "don't care" state. This entry may match any of the four search keys: "10000," "10010," "10100," or "10110." TCAM 360 may be implemented for two entries that are written to TCAM 360 for each search item: a first entry corresponding to a pattern that is to be matched; and a second "mask" entry that specifies which fields in the first entry are "don't care" states. The first value may be the pattern and the second value may be the mask entry "11001", where a "0" may indicate that corresponding data in the pattern is to be masked (i.e., it is a "don't care" state).

An address of a highest priority match that corresponds to a particular search key may, after output by TCAM 360, be input to an action lookup table to obtain an action corresponding to the match. The action may include, for example, drop (discard) the corresponding data unit, accept (i.e., pass or do not drop) the data unit, increment a counter, or other actions. The action may then be implemented. The priority for the highest priority match may be defined by, for example, lower address values in TCAM 360 having a higher priority. In other implementations, priority may be defined differently.

In an implementation, TCAM 360 may include an ACL TCAM that includes multiple databases, and each database may include an ACL. An ACL may include a set of rules that are explicitly programmed by a network administrator or implicitly programmed by protocols. Further details of TCAM 360 are provided below in connection with one or more of FIGS. 4A-7B.

Although FIG. 3 shows example components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

TCAM CONFIGURATIONS AND OPERATIONS

FIGS. 4A-4E are diagrams illustrating example operations capable of being performed by a run mechanism on TCAM 360. The run mechanism may typically work by taking the entire space of TCAM 360 (e.g., per database), and splitting the space into pages (e.g., into one or more blocks of memory space). As shown in FIG. 4A, TCAM 360 may be split by the run mechanism into one-hundred pages labeled PAGES 0-99. When adding a rule to TCAM 360, the run mechanism may select a page from a largest run (e.g., number of blocks of memory space) available. By doing this, at any given time when inserting a rule in TCAM 360, the run mechanism may ensure that a page will be free (e.g., memory space for the rule will be available) without any rule movement within TCAM 360. The run mechanism may also add a filter (e.g., filter X) without moving any rules associated with another filter (e.g., filter Y) provided in TCAM 360 because the pages of TCAM 360 may be independently managed per filter. In such an arrangement, the run mechanism may utilize all available memory space of TCAM 360.

It may be assumed, for example, that four pages of TCAM 360 are to be allocated for rules of a particular firewall. The run mechanism may execute a first run that allocates a first rule 410 of the particular firewall to PAGE 50 of TCAM 360, as shown in FIG. 4B. After the first run, TCAM 360 may include free or available space at PAGES 0-49 and PAGES 51-99. The run mechanism may execute a second run that allocates a second rule 420 of the particular firewall to PAGE 25 of TCAM 360, as shown in FIG. 4C. After the second run, TCAM 360 may include free space at PAGES 0-24, PAGES 26-49, and PAGES 51-99.

The run mechanism may execute a third run that allocates a third rule 430 of the particular firewall to PAGE 75 of TCAM 360, as shown in FIG. 4D. After the third run, TCAM 360 may include free or available space at PAGES 0-24, PAGES 26-49, PAGES 51-74 and PAGES 76-99. The run mechanism may execute a fourth run that allocates a fourth rule 440 of the particular firewall to PAGE 12 of TCAM 360, as shown in FIG. 4E. After the fourth run, TCAM 360 may include free space at PAGES 0-11, PAGES 13-24, PAGES 26-49, PAGES 51-74, and PAGES 76-99.

Although FIGS. 4A-4E show example operations capable of being performed by the run mechanism on TCAM 360, in other implementations, the run mechanism may perform fewer operations, different operations, or additional operations than depicted in FIGS. 4A-4E.

Figure 5:
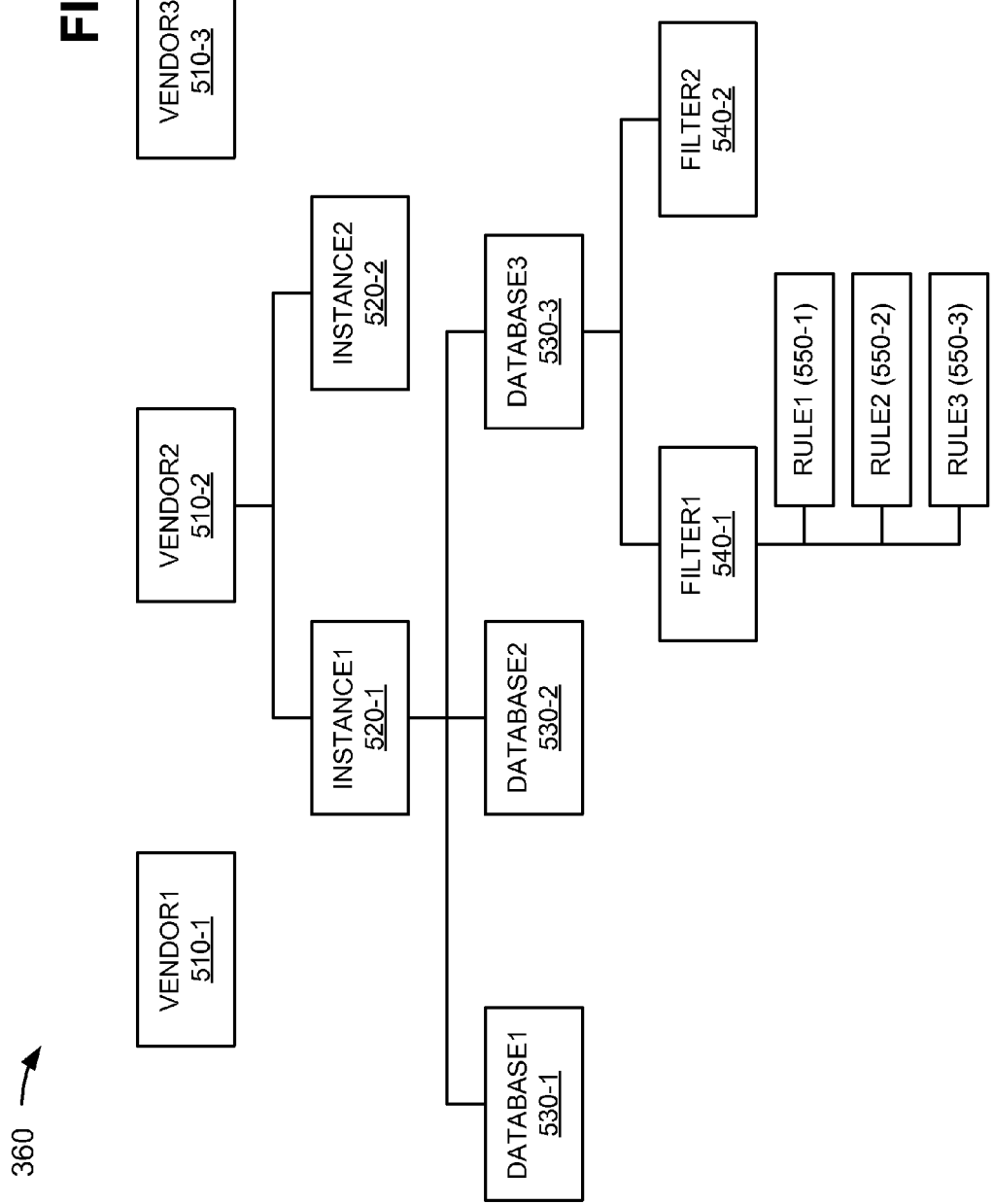
FIG. 5 is a diagram of an example portion of the TCAM depicted in FIG. 3.

FIG. 5 is a diagram of an example portion of TCAM 360. As shown, TCAM 360 may include one or more vendors 510-1 through 510-3 (collectively referred to as "vendors 510"); one or more instances 520-1 and 520-2 (collectively referred to as "instances 520"); one or more databases 530-1 through 530-3 (collectively referred to as "databases 530"); one or more filters 540-1 and 540-2 (collectively referred to as "filters 540"); and one or more rules 550-1 through 550-3 (collectively referred to as "rules 550").

As further shown in FIG. 5, INSTANCE1 520-1 and INSTANCE2 520-2 may be associated with VENDOR2 510-2. DATABASE1 530-1, DATABASE2 530-2, and DATABASE3 530-3 may be associated with INSTANCE1 520-1. FILTER1 540-1 and FILTER2 540-2 may be associated with DATABASE3 530-3. RULE1 550-1, RULE2 550-2, and RULE3 550-3 may be associated with FILTER1 540-1.

Vendors 510 may include identifications of vendors that provide one or more devices and/or components of devices provided in network device 110. For example, network device 110 may include ASICs provided by a first vendor (e.g., VENDOR1 510-1), FPGAs provided by a second vendor (e.g., VENDOR2 510-2), and processors provided by a third vendor (e.g., VENDOR3 510-3).

Instances 520 may include one or more devices and/or components of devices provided in network device 110. For example, instances 520 may include one or more ASICs, one or more FPGAs, and/or other components. Instances 520 may interconnect with each other and/or with TCAM 360 via wired or wireless connections.

An ASIC may include an integrated circuit customized for a particular use, rather than intended for a general-purpose use. For example, an ASIC may include a chip designed to execute one or more operations of a device (e.g., input IOC 300, input PFE 310, etc.) provided in network device 110. In an implementation, an ASIC may be associated with TCAM 360, with one or more databases stored in TCAM 360, etc.

A FPGA may include an integrated circuit designed to be configured by a customer (e.g., "field-programmable"). For example, a FPGA may be configured to execute one or more operations of a device (e.g., input IOC 300, input PFE 310, etc.) provided in network device 110. In an implementation, a FPGA may be associated with TCAM 360, with one or more databases stored in TCAM 360, etc.

Other components may include one or more devices that may be associated with TCAM 360. In an implementation, other components may be associated with one or more databases stored in TCAM 360. An example of other components may include an integrated circuit with programmable logic.

Databases 530 may include local databases and/or global databases. A local database may include a logical entity that may be defined by a set of entries that are searchable during a hardware lookup cycle. In an implementation, a local database may include a database with a unique database identifier (ID) and one or more ACLs (e.g., sets of rules), and whose rules are programmed for a particular component. A global database may include a logical entity that may be defined by a set of entries that are searchable during a hardware lookup cycle. In an implementation, a global database may include a database with a unique database identifier (ID) and one or more ACLs (e.g., sets of rules). Unlike a local database, a global database may include rules that are programmed for every component.

Filters 540 may include ternary bit strings that are stored in decreasing priority order. Given a packet header, a search for a best matched filter with a highest priority may be performed on all TCAM 360 entries in parallel. An index of a first matched filter may be used to access memory of TCAM 360 to retrieve associated data.

Rules 550 may provide instructions for handling packets (e.g., instructions for handling denial of service (DoS) attacks, etc.). Rules 550 may be explicitly programmed by a network administrator or implicitly programmed by protocols. Each of rules 550 may include two components: a rule header and a rule option. The rule header may include one of more fixed fields (e.g., a protocol field, a source Internet protocol (IP) field, a source port field, a destination IP field, a destination port field, etc.). The rule option may provide instructions (e.g., instructions that specify, for example, intrusion patterns to be used to scan a packet).

Although FIG. 5 shows example elements of a portion of TCAM 360, in other implementations, TCAM 360 may include fewer elements, different elements, differently arranged elements, or additional elements than depicted in FIG. 5.

Figure 6:
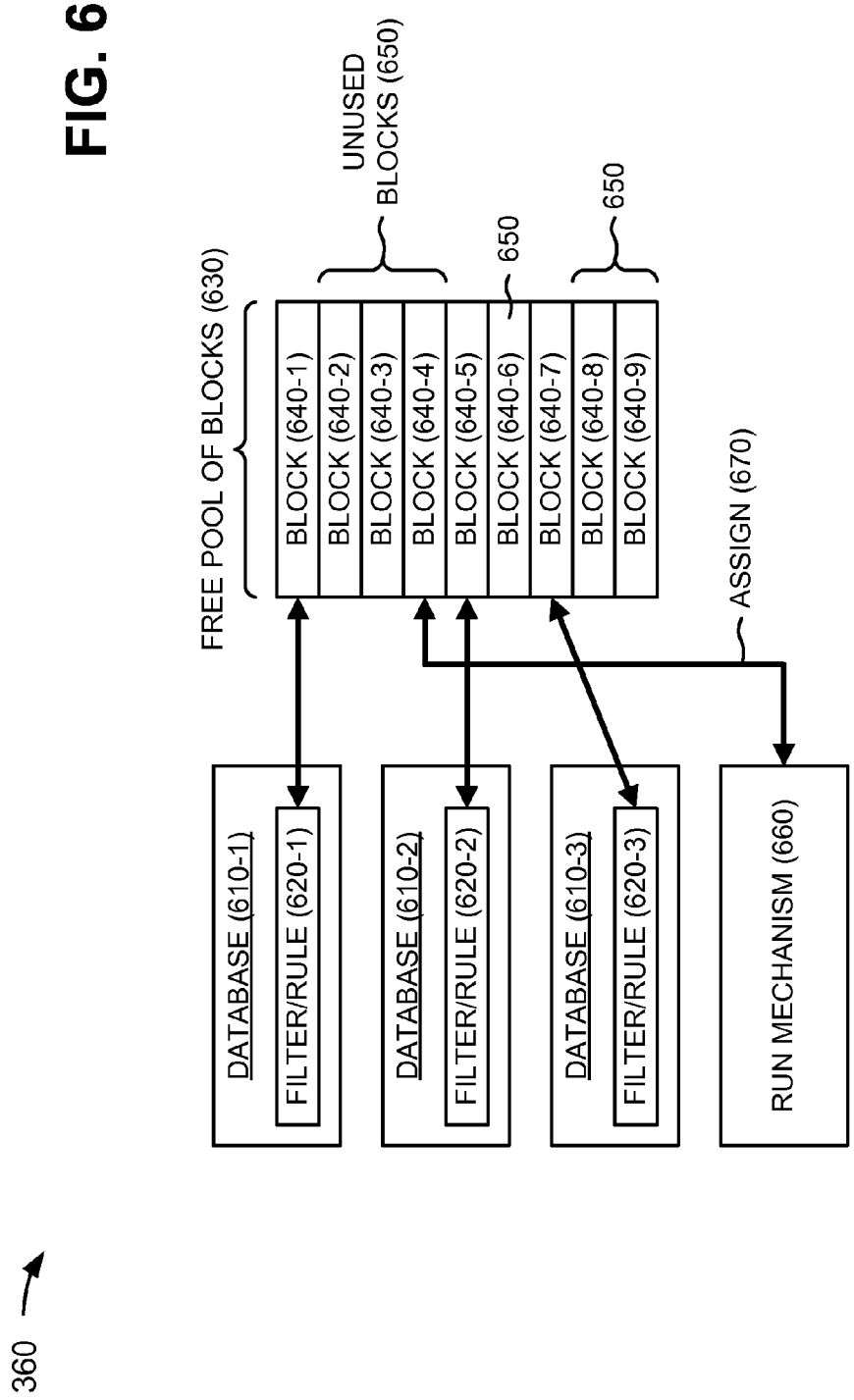
FIG. 6 is a diagram of example operations capable of being performed by a portion of the TCAM depicted in FIG. 3.

FIG. 6 is a diagram of example operations capable of being performed by a portion of TCAM 360. In one implementation, the entire memory space of TCAM 360 may not be allocated to the run mechanism since customers may not utilize the entire memory space of TCAM 360 and/or may utilize a small portion of TCAM's 360 memory space. If such customers utilized the entire memory space of TCAM 360, TCAM 360 may unnecessarily consume power to minimize rule movement (e.g., via the run mechanism) which may only occur occasionally.

As shown in FIG. 6, TCAM 360 may include one or more databases 610-1 through 610-3 (collectively referred to as "databases 610"); one or more filters and/or rules 620-1 through 620-3 (collectively referred to as "filters/rules 620"); a free pool 630 of one or more blocks of memory 640-1 through 640-9 (collectively referred to as "blocks 640"); one or more unused blocks of memory 650; and a run mechanism 660 (e.g., allocated to a portion of TCAM 360 rather than the entire memory space of TCAM 360).

Databases 610 may include the features described above in connection with databases 530. For example, databases 610 may include local databases and/or global databases. A local database may include a logical entity that may be defined by a set of entries that are searchable during a hardware lookup cycle. In one implementation, a local database may include a database with a unique database identifier (ID) and one or more ACLs (e.g., sets of rules), and whose rules are programmed for a particular component. A global database may include a logical entity that may be defined by a set of entries that are searchable during a hardware lookup cycle. In one implementation, a global database may include a database with a unique database identifier (ID) and one or more ACLs (e.g., sets of rules). Unlike a local database, a global database may include rules that are programmed for every component.

Filters/rules 620 may include the features described in connection with filters 540 and rules 550. For example, filters 620 may include ternary bit strings that are stored in decreasing priority order. Given a packet header, a search for a best matched filter with a highest priority may be performed on all TCAM 360 entries in parallel. An index of a first matched filter may be used to access memory of TCAM 360 to retrieve associated data. Rules 620 may provide instructions for handling packets (e.g., instructions for handling DoS attacks, etc.). Each of rules 620 may include two components: a rule header and a rule option. The rule header may include one of more fixed fields (e.g., a protocol field, a source IP field, a source port field, a destination IP field, a destination port field, etc.). The rule option may provide instructions (e.g., instructions that specify, for example, intrusion patterns to be used to scan a packet).

Free pool 630 may include a pool of blocks of memory 640 that may be allocated to one or more databases 610 and/or one or more filters/rules 620. As shown in FIG. 6, block 640-1 may be allocated to filter/rule 620-1 (e.g., for storing information associated with filter/rule 620-1) of database 610-1; block 640-5 may be allocated to filter/rule 620-2 (e.g., for storing information associated with filter/rule 620-2) of database 610-2; and block 640-7 may be allocated to filter/rule 620-3 (e.g., for storing information associated with filter/rule 620-3) of database 610-3. In one implementation, some of blocks 640 (e.g., unused blocks 650) of free pool 630 may not be allocated to one or more databases 610 and/or one or more filters/rules 620. This may enable TCAM 360 to minimize power consumption.

Each of blocks 640 may include an independent unit of memory space (e.g., of any size) that may be turned on or off to save power consumed by TCAM 360. In one example, each of blocks 640 may be one kilobyte in size so that run mechanism 660 may optimize filter/rule movement in TCAM 360 and may minimize power consumption by TCAM 360. In other examples, each of blocks 640 may be larger than one kilobyte in size to accommodate filters that are larger than one kilobyte in size.

Run mechanism 660 may split TCAM 360 into pages (e.g., one or more blocks of memory space). When adding a rule to TCAM 360, run mechanism 660 may select a page from a largest run available. By doing this at any given time when inserting a rule in TCAM 360, run mechanism 660 may ensure that a page will be free (e.g., memory space for the rule will be available) without any rule movement within TCAM 360. Run mechanism 660 may also add a filter (e.g., filter X) without moving any rules associated with another filter (e.g., filter Y) provided in TCAM 360 because the pages of TCAM 360 may be independently managed per filter. However, run mechanism 660 may be modified so that it utilizes only a portion of the memory space of TCAM 360.

In one implementation, run mechanism 660 may be modified so that no blocks 640 of free pool 630 are assigned to run mechanism 660 initially. When space is required by run mechanism 660 (e.g., for a rule, filter, and/or database), one of unused blocks 650 of free pool 630 may be assigned to run mechanism 660, as indicated by reference number 670. Based on assignment of unused block 650 (e.g., block 640-4), run mechanism 660 may have memory space available for rule/filter/database allocation, rule movement may be minimized (e.g., by run mechanism 660), and power consumption (e.g., by TCAM 360) may be minimized. Block 640-4 may be added (e.g., by run mechanism 660) to a database and may be considered a new run (e.g., having a size of block 640-4) that is available to run mechanism 660. Depending on the sequence of block 640-4 in blocks 640 of free pool 630 (e.g., allocated to databases 610), run mechanism 660 may seamlessly function with a larger database size. If utilization of TCAM 360 is determined to decrease, unused blocks 640 of free pool 630 (e.g., that were previously allocated to a database 610) may be reclaimed by free pool 630 or may remain allocated to avoid unnecessary rule movement by TCAM 360.

Although FIG. 6 shows example operations of TCAM 360, in other implementations, TCAM 360 may perform fewer operations, different operations, or additional operations than depicted in FIG. 6.

FIGS. 7A and 7B are diagrams of further example operations capable of being performed by a portion of TCAM 360. As shown in FIGS. 7A and 7B, TCAM 360 may include databases 610, filters/rules 620, free pool 630 of blocks of memory 640, unused blocks of memory 650, and run mechanism 660. Databases 610, filters/rules 620, free pool 630, blocks 640, unused blocks 650, and run mechanism 660 may include the features described above in connection with FIG. 6.

TCAM space is typically divided into multiple databases for isolating the databases during parallel searches. The order in which blocks of a TCAM are assigned to a database may need to be tracked so that if there are multiple matches returned during a parallel search, a lowest index from a lowest block may be returned. Based on this restriction, how a block is assigned or unassigned in the modified run mechanism may reduce unnecessary rule movement in TCAM 360 (e.g., during allocation or de-allocation of blocks 640). If TCAM 360 randomly selects (e.g., for run mechanism 660) a block 640 from free pool 630 (e.g., as was done in FIG. 6) and run mechanism 660 appends the randomly selected block 640 to a database, one or more rules of TCAM 360 may need to be moved to maintain the order (e.g., the precedence) of blocks in TCAM 360.

Although any one of unused blocks 650 of free pool 630 may be assigned to run mechanism 660, as shown in FIG. 6, run mechanism 660 may be further modified to ensure that rule movement in TCAM 360 is minimized. When space is required by run mechanism 660 (e.g., for a rule, filter, and/or database), as shown in FIG. 7A, this may be accomplished by assigning, to run mechanism 660 a lowest block number of unused blocks 650 that is above a highest block 640 allocated to databases 610, as indicated by reference number 710. For example, since block 640-7 is the highest block 640 allocated to databases 610 and block 640-8 is the lowest unused block 650 above block 640-7, run mechanism 660 may be assigned block 640-8 (e.g., for allocating to a rule, filter, and/or database). In such an arrangement, the addition of unused block 650 of free pool 630 (e.g., block 640-8) to run mechanism 660 may not cause rule movement in TCAM 360 (e.g., to accommodate block 640-8).

In one implementation, if there is no unused block 650 that is above a highest block 640 allocated to databases 610 (e.g., so as to avoid rule movement in TCAM 360), run mechanism

660 may be assigned the smallest unused block 650 (e.g., block 640-2) in free pool 630. This may minimize the probability of rule movement for any future requests for unused blocks 650 of free pool 630.

With reference to FIG. 7B, when a block 640 allocated to one of databases 610 is to be used by another one of databases 610, TCAM 360 may select a highest block 640 assigned to one of databases 610, as indicated by reference number 720. For example, since block 640-7 is the highest block 640 assigned to one of databases 610, block 640-7 may be freed for use by other databases 610, as indicated by reference number 730. In one implementation, block 640-7 may be reassigned to free pool 630 when TCAM 360 requires extra space. In another implementation, block 640-7 may be immediately reassigned to free pool 630. Such an arrangement may ensure that rule movement in TCAM 360 is minimized.

Although FIGS. 7A and 7B show example operations of TCAM 360, in other implementations, TCAM 360 may perform fewer operations, different operations, or additional operations than depicted in FIGS. 7A and 7B.

EXAMPLE PROCESS

Figure 8:
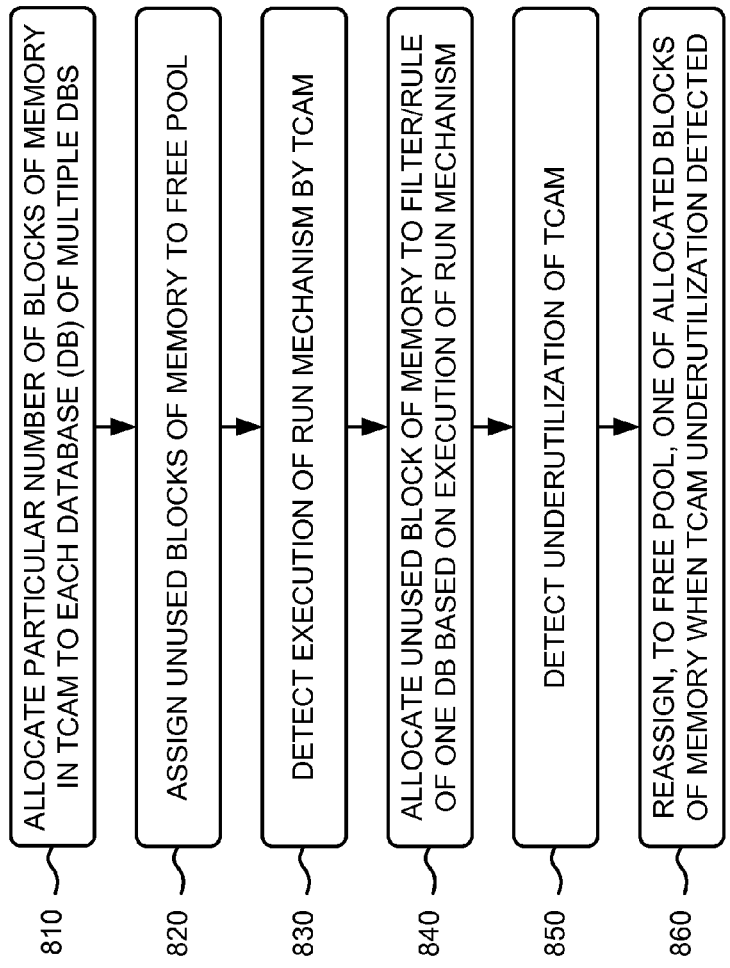

FIGS. 8-10 are flow charts of a process 800 for providing power efficient and rule movement optimized TCAM management according to implementations described herein. In one implementation, process 800 may be performed by network device 110. In another implementation, some or all of process 800 may be performed by one or more components (e.g., control unit 240) of network device 110.

As illustrated in FIG. 8, process 800 may include allocating a particular number of blocks of memory in a TCAM to each database of multiple databases (block 810), and assigning unused blocks of memory to a free pool (block 820). For example, in implementations described above in connection with FIG. 6, free pool 630 may include a pool of blocks of memory 640 that may be allocated to one or more databases 610 and/or one or more filters/rules 620. Block 640-1 may be allocated to filter/rule 620-1 (e.g., for storing information associated with filter/rule 620-1) of database 610-1; block 640-5 may be allocated to filter/rule 620-2 (e.g., for storing information associated with filter/rule 620-2) of database 610-2; and block 640-7 may be allocated to filter/rule 620-3 (e.g., for storing information associated with filter/rule 620-3) of database 610-3. In one example, some of blocks 640 (e.g., unused blocks 650) of free pool 630 may not be allocated to one or more databases 610 and/or one or more filters/rules 620. This may enable TCAM 360 to minimize power consumption (e.g., by run mechanism 660).

As further shown in FIG. 8, process 800 may include detecting execution of a run mechanism by the TCAM (block 830), and allocating an unused block of memory to a filter or rule of one database based on execution of the run mechanism (block 840). For example, in implementations described above in connection with FIG. 6, when space is required by run mechanism 660 (e.g., for a rule, filter, and/or database), one of unused blocks 650 of free pool 630 may be assigned to run mechanism 660, as indicated by reference number 670. Based on assignment of unused block 650 (e.g., block 640-4), run mechanism 660 may have memory space available for rule/filter/database allocation, rule movement may be minimized (e.g., by run mechanism 660), and power consumption (e.g., by TCAM 360) may be minimized. Block 640-4 may be added (e.g., by run mechanism 660) to a database and may be considered a new run (e.g., having a size of block 640-4) that is available to run mechanism 660.

Returning to FIG. 8, process 800 may include detecting underutilization of the TCAM (block 850), and reassigning, to the free pool, one of the allocated blocks of memory when TCAM underutilization is detected (block 860). For example, in implementations described above in connection with FIG. 6, if utilization of TCAM 360 is determined to decrease, unused blocks 640 of free pool 630 (e.g., that were previously allocated to a database 610) may be reclaimed by free pool 630 or may remain allocated to avoid unnecessary rule movement by TCAM 360.

Process block 840 may include the process blocks depicted in FIG. 9. As shown in FIG. 9, process block 840 may include determining a lowest unused block of memory that is greater than a highest allocated block of memory assigned to one of the databases (block 900), and allocating the determined unused block of memory, greater than the highest allocated block of memory, to a filter or rule of one of the databases based on execution of the run mechanism (block 910). For example, in implementations described above in connection with FIG. 7A, when space is required by run mechanism 660 (e.g., for a rule, filter, and/or database), run mechanism 660 may be assigned a lowest block number of unused blocks 650 that is above a highest block 640 allocated to databases 610, as indicated by reference number 710. In one example, since block 640-7 is the highest block 640 allocated to databases 610 and block 640-8 is the lowest unused block 650 above block 640-7, run mechanism 660 may be assigned block 640-8 (e.g., for allocating to a rule, filter, and/or database). In such an arrangement, the addition of unused block 650 of free pool 630 (e.g., block 640-8) to run mechanism 660 may not cause rule movement in TCAM 360 (e.g., to accommodate block 640-8).

Process block 860 may include the process blocks depicted in FIG. 10. As shown in FIG. 10, process block 860 may include determining a highest allocated block of memory assigned to one of the databases (block 1000), and one of reassigning, to the free pool, the determined allocated block of memory when another database of the TCAM requires extra space (block 1010) or immediately reassigning, to the free pool, the determined allocated block of memory (block 1020). For example, in implementations described above in connection with FIG. 7B, when a block 640 allocated to one of databases 610 is to be used by another one of databases 610, TCAM 360 may select a highest block 640 assigned to one of databases 610, as indicated by reference number 720. For example, since block 640-7 is the highest block 640 assigned to one of databases 610, block 640-7 may be freed for use by other databases 610, as indicated by reference number 730. In one implementation, block 640-7 may be reassigned to free pool 630 when another database of TCAM 360 requires extra space. In another implementation, block 640-7 may be immediately reassigned to free pool 630 when underutilization of a TCAM 360 database is greater than one block. For example, one block of TCAM 360 may be reassigned to free pool 630 when a database has one block underutilization or on-demand when a database needs a block. Such an arrangement (e.g., delayed on-demand freeing of blocks) may save power and may ensure that rule movement in TCAM 360 is minimized.

CONCLUSION

Implementations described herein may include systems and/or methods that provide power efficient and rule movement optimized TCAM management for network devices. The systems and/or methods may modify the run mechanism so that rule movements in a TCAM are optimized and so that the TCAM is power efficient (e.g., for a network device containing the TCAM). The run mechanism may be modified since it may be allocated only a portion of the TCAM space, rather than the entire TCAM space (e.g., as is typically done for the run mechanism). The systems and/or methods may also select blocks of memory in the TCAM in such a way that the modified run mechanism is more efficient in rule movement.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device, the method comprising:
   allocating, by the network device, blocks of memory in a ternary content-addressable memory (TCAM) of the network device to each database of a plurality of databases;
   assigning, by the network device, unused blocks of memory of the TCAM to a free pool;
   detecting, by the network device, execution of a run mechanism by the TCAM; and
   allocating, by the network device and based on the execution of the run mechanism, one of the unused blocks of memory to a filter or rule of one of the plurality of databases,
      allocating the one of the unused blocks of memory enabling the TCAM to conserve power.
2. The method of claim 1, further comprising:
   detecting underutilization of the TCAM; and
   reassigning, to the free pool, one or more of the allocated blocks of memory of the TCAM when the TCAM underutilization is detected.
3. The method of claim 2, where each block, of the allocated blocks, is associated with a different block number, and where reassigning one or more of the allocated blocks of memory further comprises:
   determining an allocated block of memory of the TCAM, with a highest block number of the associated different block numbers, assigned to one of the plurality of databases; and
   reassigning, to the free pool, the determined allocated block of memory when the TCAM requires extra space.
4. The method of claim 2, where each block, of the allocated blocks, is associated with a different block number, and where reassigning one of the allocated blocks of memory further comprises:
   determining an allocated block of memory of the TCAM, with a highest block number of the associated different block numbers, assigned to one of the plurality of databases; and
   reassigning, immediately to the free pool, the determined allocated block of memory.
5. The method of claim 1, where each block, of the allocated blocks, is associated with a different block number, and where allocating one of the unused blocks of memory further comprises:
   determining an unused block of memory of the TCAM, with a lowest block number, that is greater than a highest block number associated with an allocated block of memory of the TCAM assigned to one of the plurality of databases; and
   allocating, based on execution of the run mechanism, the determined unused block of memory to a filter or a rule of a particular database of the plurality of databases.
6. The method of claim 5, where allocating the determined unused block of memory minimizes rule movement in the TCAM.
7. The method of claim 1, where the network device comprises one or more of:
   a gateway,
   a router,
   a switch,
   a firewall,
   a network interface card (NIC),
   a hub,
   a bridge,
   a proxy server, or
   an optical add-drop multiplexer (OADM).
8. The method of claim 1, where a portion of the TCAM is allocated to the run mechanism.
9. A network device, comprising:
   a memory to:
      store a plurality of instructions,
      the memory including a ternary content-addressable memory (TCAM); and a processor to execute instructions in the memory to:
      allocate a number of blocks of memory in the TCAM to each database of a plurality of databases,
      assign unused blocks of memory of the TCAM to a free pool,
      detect execution of a run mechanism by the TCAM, the run mechanism being configured to add one or more filters or rules to the plurality of databases, and
      allocate, based on the execution of the run mechanism, one of the unused blocks of memory to a filter or rule of one of the plurality of databases,
         allocating the one of the unused blocks of memory enabling the TCAM to conserve power.
10. The network device of claim 9, where the network device comprises one or more of:
   a gateway, a router,
a switch,
a firewall,
a network interface card (NIC),
a hub,
a bridge,
a proxy server, or
an optical add-drop multiplexer (OADM).

11. The network device of claim 9, where the processor is further to execute instructions in the memory to:
   detect underutilization of the TCAM, and
   reassign, to the free pool, one or more of the allocated number of blocks of memory of the TCAM when the TCAM underutilization is detected.

12. The network device of claim 11, where each block, of the number of blocks, is associated with a different block number, and
   where, when reassigning one of the allocated blocks of memory, the processor is further to execute instructions in the memory to:
      determine an allocated block of memory of the TCAM, with a highest block number of the associated different block numbers, assigned to one of the plurality of databases, and
      reassign, to the free pool, the determined allocated block of memory when the TCAM requires extra space.

13. The network device of claim 11, where each block, of the number of blocks, is associated with a different block number, and
   where, when reassigning one of the allocated blocks of memory, the processor is further to execute instructions in the memory to:
      determine an allocated block of memory of the TCAM, with a highest block number of the associated different block numbers, assigned to one of the plurality of databases, and
      reassign, immediately to the free pool, the determined allocated block of memory.

14. The network device of claim 9, where each block, of the number of blocks, is associated with a different block number, and
   where, when allocating one of the unused blocks of memory, the processor is further to execute instructions in the memory to:
      determine an unused block of memory of the TCAM, with a lowest block number, that is greater than a highest block number associated with an allocated block of memory of the TCAM assigned to one of the plurality of databases, and
      allocate, based on execution of the run mechanism, the determined unused block of memory to a filter or a rule of a particular database of the plurality of databases.

15. The network device of claim 14, where allocating the determined unused block of memory minimizes rule movement in the TCAM.

16. The network device of claim 9, where a portion of the TCAM is allocated to the run mechanism.

17. The network device of claim 9, where the TCAM comprises an access control list (ACL) TCAM associated with one or more components of the network device.

18. A device comprising:
   a ternary content-addressable memory (TCAM); and
   a processor to:
      allocate a number of blocks of memory in the TCAM to each database of a plurality of databases,
         each block, of the number of blocks, being associated with a block number,
      assign unused blocks of memory of the TCAM to a free pool,
      detect execution of a run mechanism by the TCAM,
      determine an unused block of memory of the TCAM, with a lowest block number that is greater than a highest block number associated with an allocated block of memory of the TCAM assigned to one of the plurality of databases,
      allocate, based on execution of the run mechanism, the determined unused block of memory to a filter or a rule of a particular database of the plurality of databases,
      detect underutilization of the TCAM, and
      reassign, to the free pool, one of the allocated blocks of memory of the TCAM when the TCAM underutilization is detected.

* * * * *